US012812535B2

(12) United States Patent
Manna et al.

(10) Patent No.: US 12,812,535 B2
(45) Date of Patent: Nov. 24, 2026

(54) LOW-POWER WIRELESS DEVICE

(71) Applicant: Nokia Technologies Oy, Espoo (FI)

(72) Inventors: Tanumay Manna, Bangalore (IN); Brajesh Soni, Bangalore (IN); Knud Knudsen, Aalborg (DK); Jan Torst Hviid, Aalborg (DK); Smita Shetty, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 291 days.

(21) Appl. No.: 18/617,070

(22) Filed: Mar. 26, 2024

(65) Prior Publication Data

US 2024/0334330 A1 Oct. 3, 2024

(30) Foreign Application Priority Data

Mar. 30, 2023 (IN) ............................. 202341023771

(51) Int. Cl.
*H04W 52/02* (2009.01)
*H04W 74/0833* (2024.01)

(52) U.S. Cl.
CPC ... *H04W 52/0229* (2013.01); *H04W 52/0245* (2013.01); *H04W 74/0833* (2013.01)

(58) Field of Classification Search
CPC ......... H04W 52/0229; H04W 52/0245; H04W 74/0833; H04W 16/28; H04W 76/19; Y02D 30/70; H04B 7/06964
See application file for complete search history.

(56) References Cited

U.S. PATENT DOCUMENTS

| | | | | |
|---|---|---|---|---|
| 2020/0008260 | A1* | 1/2020 | Islam | H04B 7/06952 |
| 2020/0037388 | A1 | 1/2020 | Nam et al. | |
| 2022/0095228 | A1* | 3/2022 | Sahin | H04W 52/0216 |
| 2022/0109488 | A1 | 4/2022 | Nam et al. | |
| 2022/0116876 | A1 | 4/2022 | Sun et al. | |
| 2022/0303795 | A1* | 9/2022 | Bala | H04W 24/08 |

(Continued)

FOREIGN PATENT DOCUMENTS

| | | |
|---|---|---|
| WO | 2022/041121 A1 | 3/2022 |
| WO | 2022/197652 A1 | 9/2022 |

OTHER PUBLICATIONS

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

(Continued)

*Primary Examiner* — Jung H Park
(74) *Attorney, Agent, or Firm* — Lippes Mathias LLP

(57) ABSTRACT

According to an example aspect of the present invention, there is provided an apparatus configured to determine a wake-up signal beam failure relating to a subset of configured wake-up signal beams in a cell, provide to a node controlling the cell a request to recover from the wake-up signal beam failure, the request comprising a list of wake-up signal beam identities ordered based on received signal strengths at which the respective wake-up signal beams are received at the apparatus, receive a response from the node controlling the cell, the response indicating a second subset of the configured wake-up signal beams in the cell, and begin monitoring the second subset of the configured wake-up signal beams.

20 Claims, 6 Drawing Sheets

(56) References Cited

U.S. PATENT DOCUMENTS

2023/0209463 A1* 6/2023 Shih .................. H04W 52/0216
370/311

OTHER PUBLICATIONS

"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.
"3rd Generation Partnership Project; Technical Specification Group Radio Access Network; NR; Requirements for support of radio resource management (Release 18)", 3GPP TS 38.133, V18.0.0, Dec. 2022, pp. 1-5205.
"3rd Generation Partnership Project; Technical Specification Group Radio Access Network; NR; User Equipment (UE) procedures in Idle mode and RRC Inactive state (Release 17)", 3GPP TS 38.304, V17.3.0, Dec. 2022, pp. 1-51.
"Motivation for new study item on ultra-low power wake up signal in Rel-18", 3GPP TSG RAN Rel-18 workshop, RWS-210168, Agenda: 4.3, vivo, Jun. 28-Jul. 2, 2021, 13 pages.
"IEEE Standard for Information technology—Telecommunications and information exchange between systems Local and metropolitan area networks—Specific requirements—Part 11: Wireless LAN Medium Access Control (MAC) and Physical Layer (PHY) Specifications, Amendment 3: Wake-Up Radio Operation", IEEE Computer Society, IEEE Std 802.11ba'-2021, Mar. 25, 2021, 180 pages.
"3rd Generation Partnership Project; Technical Specification Group Radio Access Network; Evolved Universal Terrestrial Radio Access (E-UTRA); User Equipment (UE) procedures in idle mode (Release 17)", 3GPP TS 36.304, V17.3.0, Dec. 2022, pp. 1-66.
"3rd Generation Partnership Project; Technical Specification Group Core Network and Terminals; Non-Access-Stratum (NAS) protocol for 5G System (5GS); Stage 3; (Release 18)", 3GPP TS 24.501, V18.1.0, Dec. 2022, pp. 1-1031.
Extended European Search Report received for corresponding European Patent Application No. 24159286.4, dated Aug. 8, 2024, 8 pages.

* cited by examiner

LOW-POWER WIRELESS DEVICE

FIELD

The present disclosure relates to transmission and reception arrangements in low-power wireless devices.

BACKGROUND

Wireless communication devices may be battery-powered, wherefore optimizing use of battery power has long been an aim in design of such devices.

Minimizing power drain increases the time a battery lasts before it needs to be recharged, which enhances the usability of the overall system as a more diverse set of use cases is enabled.

While personal communication devices, such as smartphones, may be recharged every few days, there are different wireless device types which are challenging to recharge frequently. For example, sensor devices installed in vehicles or buildings may be configured to provide information on liquid flow or temperature readings, or trigger fire alarms, for example, such that they aim to be powered by a stable power source, or a very long-lasting rechargeable or replaceable battery

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core and at least one memory storing instructions that, when executed by the at least one processing core, cause the apparatus at least to determine a wake-up signal beam failure relating to a subset of configured wake-up signal beams in a cell, provide to a node controlling the cell a request to recover from the wake-up signal beam failure, the request comprising a list of wake-up signal beam identities ordered based on received signal strengths at which the respective wake-up signal beams are received at the apparatus, receive a response from the node controlling the cell, the response indicating a second subset of the configured wake-up signal beams in the cell, and begin monitoring the second subset of the configured wake-up signal beams.

According to a second aspect of the present disclosure, there is provided an apparatus comprising at least one processing core and at least one memory storing instructions that, when executed by the at least one processing core, cause the apparatus at least to receive, from a user equipment, a request to recover from a wake-up signal beam failure relating to a subset of configured wake-up signal beams in a cell controlled by the apparatus, the request comprising a list of wake-up signal beam identities ordered based on received signal strengths at which the respective wake-up signal beams are received at the user equipment, and transmit a response to the user equipment, the response indicating a second subset of configured wake-up signal beams configured in the cell, the response instructing the user equipment to begin monitoring the second subset of the configured wake-up signal beams.

According to a third aspect of the present disclosure, there is provided a method comprising determining, by an apparatus, a wake-up signal beam failure relating to a subset of configured wake-up signal beams in a cell, providing to a node controlling the cell a request to recover from the wake-up signal beam failure, the request comprising a list of wake-up signal beam identities ordered based on received signal strengths at which the respective wake-up signal beams are received in the apparatus, receiving a response from the node controlling the cell, the response indicating a second subset of the configured wake-up signal beams in the cell, and beginning monitoring the second subset of the configured wake-up signal beams.

According to a fourth aspect of the present disclosure, there is provided a method, comprising receiving, in an apparatus, from a user equipment, a request to recover from a wake-up signal beam failure relating to a subset of configured wake-up signal beams in a cell controlled by the apparatus, the request comprising a list of wake-up signal beam identities ordered based on received signal strengths at which the respective wake-up signal beams are received at the user equipment, and transmitting a response to the user equipment, the response indicating a second subset of configured wake-up signal beams configured in the cell, the response instructing the user equipment to begin monitoring the second subset of the configured wake-up signal beams.

According to a fifth aspect of the present disclosure, there is provided an apparatus comprising means for determining, by an apparatus, a wake-up signal beam failure relating to a subset of configured wake-up signal beams in a cell, providing to a node controlling the cell a request to recover from the wake-up signal beam failure, the request comprising a list of wake-up signal beam identities ordered based on received signal strengths at which the respective wake-up signal beams are received in the apparatus, and receiving a response from the node controlling the cell, the response indicating a second subset of the configured wake-up signal beams in the cell, and beginning monitoring the second subset of the configured wake-up signal beams.

According to a sixth aspect of the present disclosure, there is provided an apparatus comprising means for receiving, from a user equipment, a request to recover from a wake-up signal beam failure relating to a subset of configured wake-up signal beams in a cell controlled by the apparatus, the request comprising a list of wake-up signal beam identities ordered based on received signal strengths at which the respective wake-up signal beams are received at the user equipment, and transmitting a response to the user equipment, the response indicating a second subset of configured wake-up signal beams configured in the cell, the response instructing the user equipment to begin monitoring the second subset of the configured wake-up signal beams.

According to a seventh aspect of the present disclosure, there is provided a non-transitory computer readable medium having stored thereon a set of computer readable instructions that, when executed by at least one processor, cause an apparatus to at least determine a wake-up signal beam failure relating to a subset of configured wake-up signal beams in a cell, provide to a node controlling the cell a request to recover from the wake-up signal beam failure, the request comprising a list of wake-up signal beam identities ordered based on received signal strengths at which the respective wake-up signal beams are received in the apparatus, and receive a response from the node controlling the cell, the response indicating a second subset of the configured wake-up signal beams in the cell, and begin monitoring the second subset of the configured wake-up signal beams.

According to an eighth aspect of the present disclosure, there is provided a non-transitory computer readable medium having stored thereon a set of computer readable instructions that, when executed by at least one processor, cause an apparatus to at least receive, from a user equipment, a request to recover from a wake-up signal beam failure relating to a subset of configured wake-up signal beams in a cell controlled by the apparatus, the request comprising a list of wake-up signal beam identities ordered based on received signal strengths at which the respective wake-up signal beams are received at the user equipment, and transmit a response to the user equipment, the response indicating a second subset of configured wake-up signal beams configured in the cell, the response instructing the user equipment to begin monitoring the second subset of the configured wake-up signal beams.

DETAILED DESCRIPTION

Methods are disclosed herein to enhance the use of wake-up signalling with beamforming, wherein a user equipment, UE, at least in some cases, needs to monitor only a proper subset of all configured wake-up signal beams in a cell. In some cases, the UE might monitor all the wake-up signal beams in a cell, for example if the cell is small. After detecting a wake-up signal beam failure, a UE may request recovery from the wake-up signal beam failure by transmitting a request to the base station controlling the cell, the request including information on a sequence of the wake-up signal beams ordered based on their received signal strengths, for example, the transmission may comprise a list of wake-up signal beams of the cell arranged in a list based on received signal strengths of the respective wake-up signal beams. The base station may, based on the list, revise the subset of wake-up signal beams that the UE should monitor, to recover from the wake-up signal beam failure. A beam may also be referred to as a transmission configuration indication, TCI, or a transmission configuration indication state.

Figure 1A:
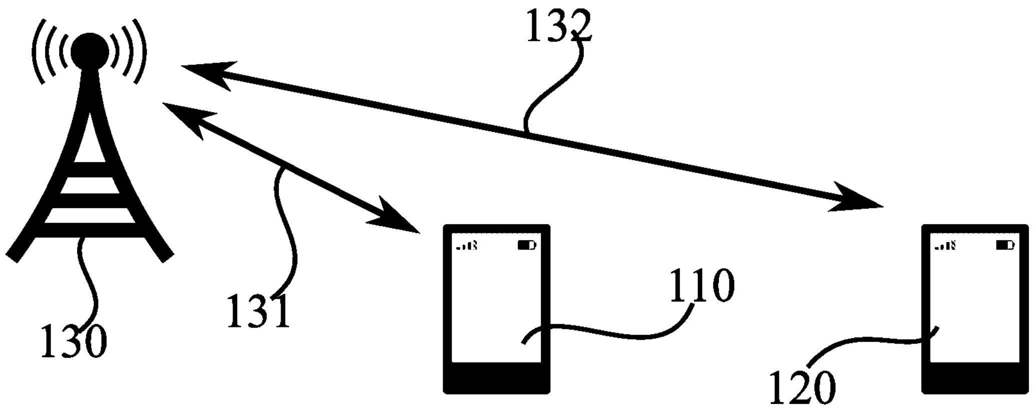
FIG. 1A illustrates an example system in accordance with at least some embodiments of the present invention.

FIG. 1A illustrates an example system in accordance with at least some embodiments of the present invention. A base node 130, such as a cellular base station 130, is configured to operate based on a suitable technical standard, such as long term evolution, LTE, fifth generation, 5G, or 6G, for example. A base station may be referred to as a radio node, network node, node, eNode B, eNB, or gNB network device. A base station is a node configured to control one or more cell(s). The base station may comprise a centralized unit, gNB-CU, and one or more distributed unit, gNB-DU. A gNB-CU and gNB-DU(s) may be connected using e.g. an F1 interface. Another term for 5G is new radio, NR. A yet further example of a suitable technical standard is 5G-Advanced. Alternatively, base node 130 may be a non-cellular base node, such as, for example, a wireless local area network, WLAN, or worldwide interoperability for microwave access, WiMAX, access point.

In addition to base node 130, the system of FIG. 1 also includes two user equipments, UEs, 110, 120. A UE may be referred to as a terminal, a terminal device, a user device or simply a device. The UEs 110, 120 comprise as a main radio, MR, a wireless transceiver configured to communicate using a cellular or non-cellular radio technology, such as one of those mentioned above, for example, to obtain interoperation with base node 130. A user equipment 110, 120 may comprise, for example, an Internet of Things, IoT, node, such as a sensor node, or a utility meter which is not an IoT node. UEs 110, 120 are illustrated as including a display screen, however this is by no means compulsory as many UEs suitable for use with the presently disclosed mechanisms are optimized for low power consumption and may well lack visual display screens. Rather, these UEs may be configured to provide, for example, an uplink transmission to base node

130 when requested, or according to a pre-configured time schedule for reporting. The uplink transmission may comprise sensor data generated by the respective UE 110, 120, or mesh-network data, for example, received in the UEs 110, 120 from further devices, which are not illustrated in FIG. 1A for the sake of clarity of the illustration. Radio links 131, 132 connect base station 130 to UE 110 and 120, respectively.

UEs 110, 120 are configured to spend time in an energy saving state when not transmitting or receiving via the wireless transceiver. The energy saving state comprises that the wireless transceiver of the UE 110, 120 is in a low-power state. The low-power state of the wireless transceiver may be one where the wireless transceiver is switched off, or placed in a hibernated or otherwise inactive state where the wireless transceiver does not monitor for incoming transmissions and does not transmit signals. Further examples of names used of the hibernated or inactive state are discontinuous reception, DRX, sleep state, DRX-Off state, RRC_Idle and RRC_Inactive state.

The energy saving state may be extensive and extend also to other systems of UE 110, 120 than the wireless transceiver. UEs 110, 120 may be powered by a non-rechargeable battery which aims to power the UEs 110, 120 for months, or even a year, wherefore optimization of power consumption needs to be conducted carefully. In particular, monitoring for transmissions using a cellular or non-cellular radio technology such as the ones mentioned above, for example, consumes necessarily so much power that in the UEs 110, 120 of FIG. 1A, these radio technologies are not used in the energy saving state. To enable communication with a UE 110, 120 in the energy saving state, the UEs 110, 120 are equipped with a wireless receiver which is separate from the wireless transceiver which is usable with the cellular or non-cellular technology to receive modulated payload data from the wireless communication system. Base node 130 may provide a signal, such as a wake-up signal, that the wireless receiver is configured to detect. The wireless receiver may be referred to, for example, as a low-power receiver, an ultra-low power receiver or a wake-up receiver, WUR. Responsive to the signal, the UE that received the signal switches its wireless transceiver from the low-power state to an active state. Examples of the active state include radio resource control, RRC_Active, DRX-On and DRX-Active. In the active state, the wireless transceiver is able to receive and/or transmit information based on the cellular or non-cellular radio technology that the UE is configured to use. Initially in the active state, the device may be in an RRC_Idle state, from which an RRC connection may be established whereby the state is switched to RRC_Connected. The wireless transceiver is the main radio of the UE, while the wireless receiver is used to receive the signal to end the energy saving state.

When the UE is in the energy saving state, it may be in an RRC_Inactive state, where the UE may behave similarly to when it is in the RRC_Idle state. In RRC_Inactive state, the Access Stratum, AS, context is stored by both UE and base station, as a result of which the state transition from inactive state to connected state is faster. In the RRC_Inactive state, the UE cannot transmit anything in the uplink except for physical random access channel, PRACH, as part of random access procedure initiated when UE desires to transit to RRC_Connected state (to transmit RRCResumeRequest) or to request for On-demand system information. The base station can send a UE from RRC_Connected to RRC_Inactive state by transmitting a RRCRelease message. The resumption of a suspended RRC connection may be initiated by upper layers when the UE needs to transition from RRC_Inactive state to RRC_Connected state, or by the RRC layer to perform an RAN Notification Area, RNA, update or by RAN paging.

In the situation of FIG. 1A, UE 110 has a clearer radio path to base node 130, wherefore a signal transmitted from base node 130 to UE 110 is received with less path loss than a signal transmitted from base node 130 to UE 120. In general UE 120 may be further away from base node 130, but this is not necessarily the case since the radio paths may be more complex in nature and include reflections from objects, which incur path loss without necessarily involving great distances. To provide a signal to UE 120, the signal may be transmitted from base node 130 using a higher transmit power, and/or using a larger number of repetitions. Repetitions may take place sequentially in time, and/or at least in part concurrently in time, using a different frequency. The repetitions may be combined in UE 120 by integrating on-duration energy and off-duration energy not only from one transmission, but from plural transmissions, for example. On-duration is the predefined portion of the transmission containing signal, while the rest of the transmission is off-duration. Off-duration energy may be used e.g. for determining a detection threshold. Base node 130 may transmit the first wake-up signal with the smallest repetition, or with no repetition, estimated sufficient for a specific UE.

Wake-up signals may be provided to groups of UEs, such that UEs are divided to multiple preconfigured groups. A group wake-up signal, GWUS, may be transmitted when there is a paging message for any UE belonging to the corresponding group. GWUS is different for each group. The GWUS configuration may be provided in system information, for example. GWUS transmissions for different groups may be multiplexed, and UEs in multiple groups in different resources may be signaled before a paging opportunity. A common wake-up signal may be configured for a wake-up signal resource to wake up UEs from all groups that are monitoring GWUS in a resource. Therefore, a UE may be configured to monitor both a group-specific GWUS and a common wake-up signal.

When a UE doesn't detect a wake-up signal successfully for a period, it cannot in principle know whether a wake-up signal is not transmitted, or if the channel quality of the link used to convey the wake-up signal is too low. Therefore, a reference signal, such as a beacon signal, can be transmitted periodically, for example at a periodicity smaller or greater than the normal rate of paging. The beacon may be transmitted over all wake-up signal beams configured in the cell. Furthermore, the beacon signal can be also used to provide timing to the WUR. For simplicity of WUR processing, the waveform of a low-power beacon signal can be the same as that of a wake-up signal. A UE can also use the beacons to calculate a received signal power, RSP, of wake-up signal beams in the cell, and leverage the RSP for radio resource management. The RSP may be defined as the average signal power (Total power−[Noise+interference power]) evaluated over a bit duration of the wake-up signal, for example.

Figure 1B:
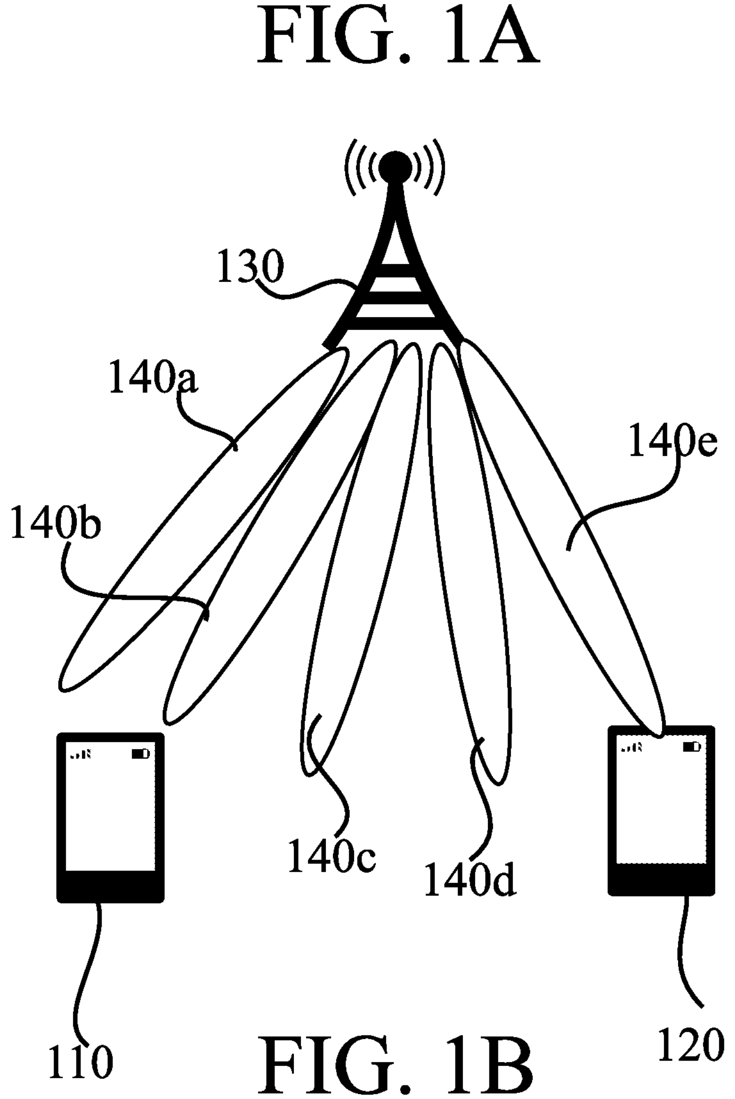
FIG. 1B illustrates an example of wake-up signal beamforming use.

FIG. 1B illustrates an example of wake-up signal beamforming use. Like numbering denotes like structure as in FIG. 1A. Wake-up signals are here transmitted in a directional manner in wake-up signal beams, which may be distinct from beams used in cellular data communication. The wake-up signal beams may be used exclusively for wake-up signal and wake-up beacon provision to UEs. Using beamforming enhances the range at which the wake-up signal may be received, which is useful since the wake-up wireless receiver of a UE may be simpler in function than the wireless transceiver of the UE, and thus less capable of detecting very weak signals.

UEs 110, 120 may be configured with proper subsets of the entire set of wake-up signal beams 140*a*-140*e* configured in a cell, to monitor. The monitoring may be in RRC_Inactive state, for example. In at least some embodiments, the subset may be deleted in the base station when the UE is in RRC_Idle state, as in the RRC_Idle state the UE context will be deleted in the base station. For example, UE 110 may be configured to monitor a subset comprising only beams 140*a* and 140*b*, while UE 120 may be configured to monitor a subset comprising only beam 140*e*. This provides the dual benefit, that wake-up signals for these UEs need not be transmitted in all beams, resulting in more efficient use of wake-up signal resources, and the UEs need not monitor all the beams. By proper subset of beams it is meant a subset of the set of all configured beams, which does not comprise all the beams in the set of all configured beams. Each UE is configured to respond to a wake-up signal for the UE conveyed over at least one of the beams in the subset of beams the UE is configured to monitor.

Figure 2A:
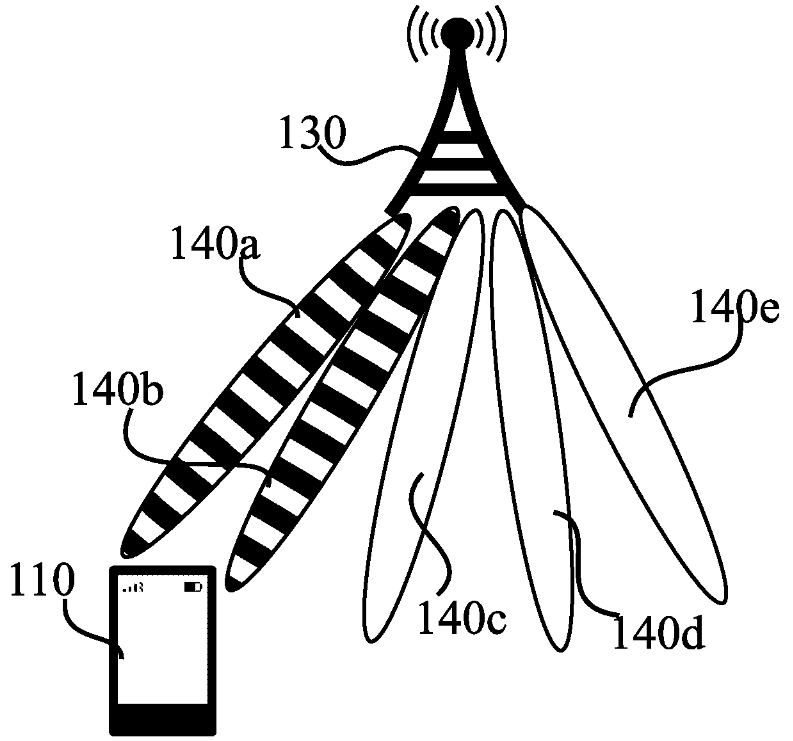
FIG. 2A illustrates a wake-up signal beamforming use.

FIG. 2A illustrates a wake-up signal beamforming use. In the situation of FIG. 2A, UE 110 is configured to monitor a subset of wake-up signal beams, the subset comprising beams 140*a* and 140*b* only. The beams of the subset are striped in the figure for clarity. This subset is a proper subset of all configured wake-up signal beams in the cell, 140*a*, 140*b*, 140*c*, 140*d* and 140*e*. UE 110 measures an RSP of wake-up signal beams in its configured subset by measuring a wake-up signal beacon provided by base station 130 over these wake-up signal beams. As long as the RSP remains in an acceptable range, for example in terms of exceeding a threshold with respect to the noise floor, the UE may consider the wake-up signal beams of the subset to be in working order.

Figure 2B:
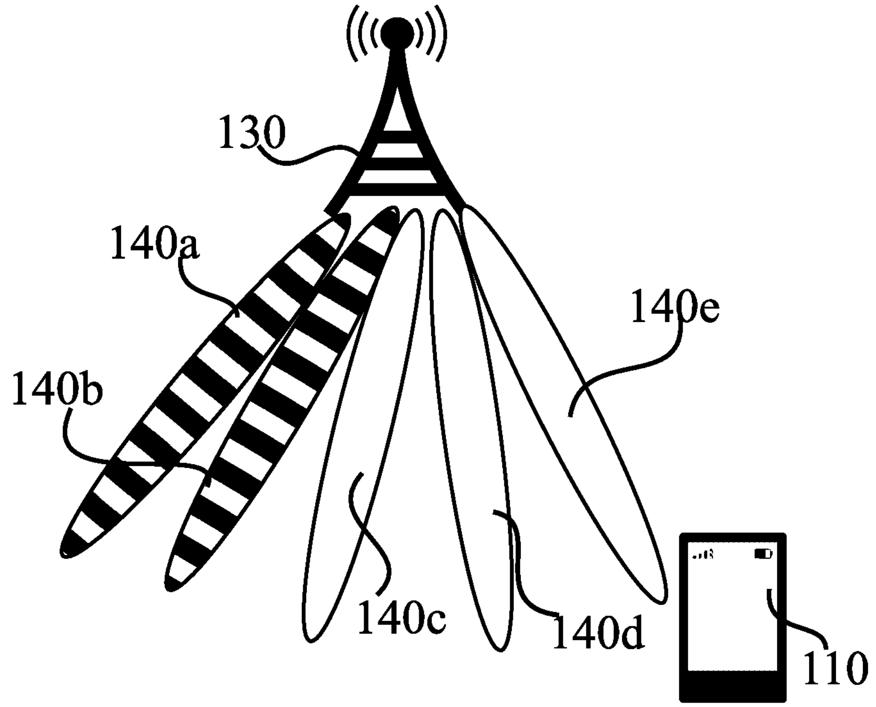
FIG. 2B illustrates a wake-up signal beamforming use.

FIG. 2B illustrates a wake-up signal beamforming use. Like numbering denotes like structure as in FIG. 2A, and the situation of FIG. 2B occurs after the situation of FIG. 2A. Here UE 110 has moved geographically in the cell, such that the beams of the subset, 140*a* and 140*b*, are no longer directed toward the UE. Here the UE may continue to periodically, for example using a fixed, constant periodicity, determine the RSP of the beams in the subset. As the beams are no longer aligned with the geographic location of UE 110, their RSP measured from the current location of UE 110 may be very low, falling below the threshold.

Responsive to all the wake-up signal beams in the configured subset falling below the RSP threshold, the UE may determine that it is in a wake-up signal beam failure situation. Such an event may also be referred to as a wake-up signal beam failure relating to a subset of configured wake-up signal beams in a cell. In the wake-up signal beam failure situation, the UE may provide to base station 130 a request to recover from the wake-up signal beam failure. This request comprises a list of wake-up signal beam identities ordered based on received signal strengths at which the respective wake-up signal beams are received in UE 110. The wake-up signal beam identities may be, for example, TCIs, TCI identities, TCI states or TCI state identities. Alternatively, the request comprises a list of received signal strengths of wake-up signal beams ordered based on wake-up signal beam identities. The request also comprises an implicit or explicit indication that a wake-up signal beam failure has occurred. The order may be in ascending or in descending order. To compile the request, UE 110 may measure all wake-up beam signal RSPs, not just those in its subset, for example using the wake-up signal beam beacon transmission described above. The request may be provided from UE 110 to the base station without transitioning the UE away from a RRC_Inactive state. For example, the request may be transmitted using a random access process, RRC signalling or medium access control, MAC, control element signalling. Such signalling may take place on the PRACH, for example. The random access process may be a two-step or a four-step random access process, for example. An advantage of maintaining the UE in RRC_Inactive state is conservation of power, since RRC_Inactive is an energy saving state. Further, leaving and re-entering the RRC_Inactive state involves signalling, which is avoided if UE 110 can be kept in the RRC_Inactive state.

In some embodiments UE 110 is configured to include in the list only those wake-up signal beams which have RSPs over a second threshold. This serves the purpose to make the request smaller and thus easier to signal toward the base station. Further, there is no real drawback, as the base station would not select very weak wake-up signal beams in the new subset for the UE to monitor. As a variant of this, the UE may be configured to include in the list at least the strongest, or the two strongest, wake-up signal beams in terms of RSP, even if they do not reach the second threshold. In some embodiments, the second threshold and the threshold the UE uses to determine a wake-up signal beams failure is the same threshold. In other embodiments, the thresholds are not set at the same level.

The base station, in receipt of the request to recover from the wake-up signal beam failure, may choose for UE 110 a new subset of wake-up signal beams to monitor, for example, it may choose the strongest beam or beams from the ordered list of wake-up beam identities provided by the UE in the request. Thus UE 110 may monitor the new subset of wake-up signal beams and it will not need to monitor all the wake-up signal beams in the cell.

The base station may provide an indication of the new subset to UE 110 without causing UE 110 to leave the RRC_Inactive state, for example using downlink signalling on the PRACH to provide a response to the request to recover from the wake-up signal beam failure. For example, the response may be provided in the downlink direction using a random access process, RRC signalling or medium access control, MAC, control element signalling. The random access process may be a 2-step or a 4-step random access process. For example, where the random access process is a 2-step process, the first step may be the request to recover from the wake-up signal beam failure and the second step may be the response from the base station. In some embodiments, the request is sent from the UE as a RRCResumeRequest or RRCResumeRequest1 message with the request message therein, and the base station transmits the response in a RRCRelease with suspendconfig message.

In one embodiment, the UE can send a request MAC control element, CE, to convey the request message to the base station. The request MAC CE may have a variable length, primarily because the number of reported candidate beams having RSP above the minimum threshold can vary. The base station on reception of request MAC CE can send the corresponding response message meant for the specific UE using response MAC CE.

Once UE 110 has the response, it may update its subset of wake-up signal beams such that it will subsequently monitor only the wake-up signal beams in the new subset. Monitoring of the wake-up signal beams in the original subset is discontinued, unless per chance one or more wake-up signal beams of the original subset is also in the new subset, which is not likely since the wake-up signal beam failure occurred when all the beams in the original subset were below the RSP threshold. The UE may send the request, and receive the response, using its main radio, the wireless transceiver.

While described herein as being determined responsive to all the wake-up signal beams in the original subset being below an RSP threshold, in various embodiments the wake-up signal beams failure may be determined on other ways as well. Further, the exact method used by the base station to select the new subset of wake-up signal beams may comprise further selection criteria than merely the order of beams in the list provided by the UE in the request. For example, the base station may consider whether the wake-up signal beams with highest RSP are available for this UE within wake-up signal groups that are relevant to this UE. If yes, they may be chosen to the new subset. If not, the base station may consider a lower-priority wake-up signal group and select a strong beam from among those resources, even if these beams are not the altogether strongest ones in the list received from the UE.

To enable the cell-specific wake-up signal tracking area, CWTA, update in RRC_Inactive state, the UE may be configured to send a RRCResumeRequest or RRCResumeRequest1 message with a CWTA-Update ResumeCause. The CWTA may correspond to the subset of wake-up signal beams configured in a cell for a specific UE. This enables CWTA update in RRC_Inactive state using the wake-up signal beam failure recovery request and response message exchange. Within a cell the base station may allocate a specific candidate set of beams of the UE, which can be termed the CWTA, by taking into account the mobility pattern of the UE and its surrounding environment. The CWTA is valid when the UE context is stored at the base station, that is, during RRC Inactive and RRC_Connected mode. A wake-up signal beam failure recovery may lead to a CWTA update.

To transmit the wake-up signal beam failure recovery request to the base station, the UE may start up its wireless transceiver for communicating the request and response thereto with the base station. The UE may use the information it has determined for wake-up signal beam RSPs to facilitate choosing a cellular synchronization signal block, SSB, beam for communicating the request and response with the base station. In some systems, there is a one-to-one correspondence between wake-up signal beams and, SSB beams in which case the UE can simply attach to the SSB beam corresponding to the wake-up signal beam with strongest RSP. In systems without a one-to-one correspondence between the beam types, there may be a different type of correspondence, usable in facilitating choice of a SSB beam to attach to bases on the RSP values of the wake-up signal beams. A synchronization signal block beam may be referred to as an SSB index, a SSB transmission configuration indication, an SSB TCI state, an SSB TCI state index, an SSB state identity, an SSB TCI index or an SSB TCI identity.

Figure 3:
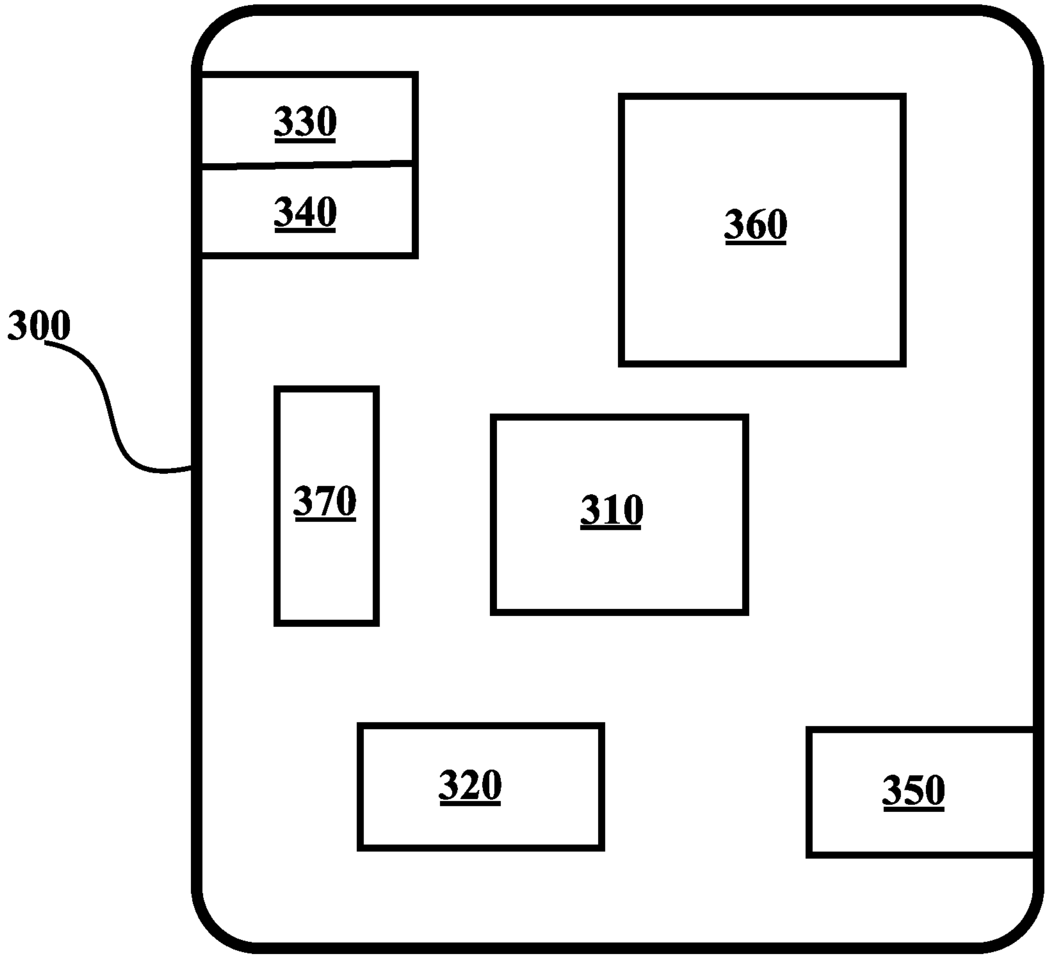
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as UE 110 of FIG. 1 or, in applicable parts, a base station. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. When processor 310 comprises more than one processor, device 300 may be a distributed device wherein processing of tasks takes place in more than one physical unit. Processor 310 may be a control device. A processing core may comprise, for example, a Cortex-A8 processing core manufactured by ARM Holdings or a Zen processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300, such as determining, providing, receiving, monitoring, performing, receiving and transmitting. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or base station, to perform various functions) and (c) hardware circuit(s) and or processor(s), such as a microprocessor (s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. Memory 320 may be non-transitory. The term “non-transitory”, as used herein, is a limitation of the medium itself (that is, tangible, not a signal) as opposed to a limitation on data storage persistency (for example, RAM vs. ROM).

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 6G, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For 30 example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
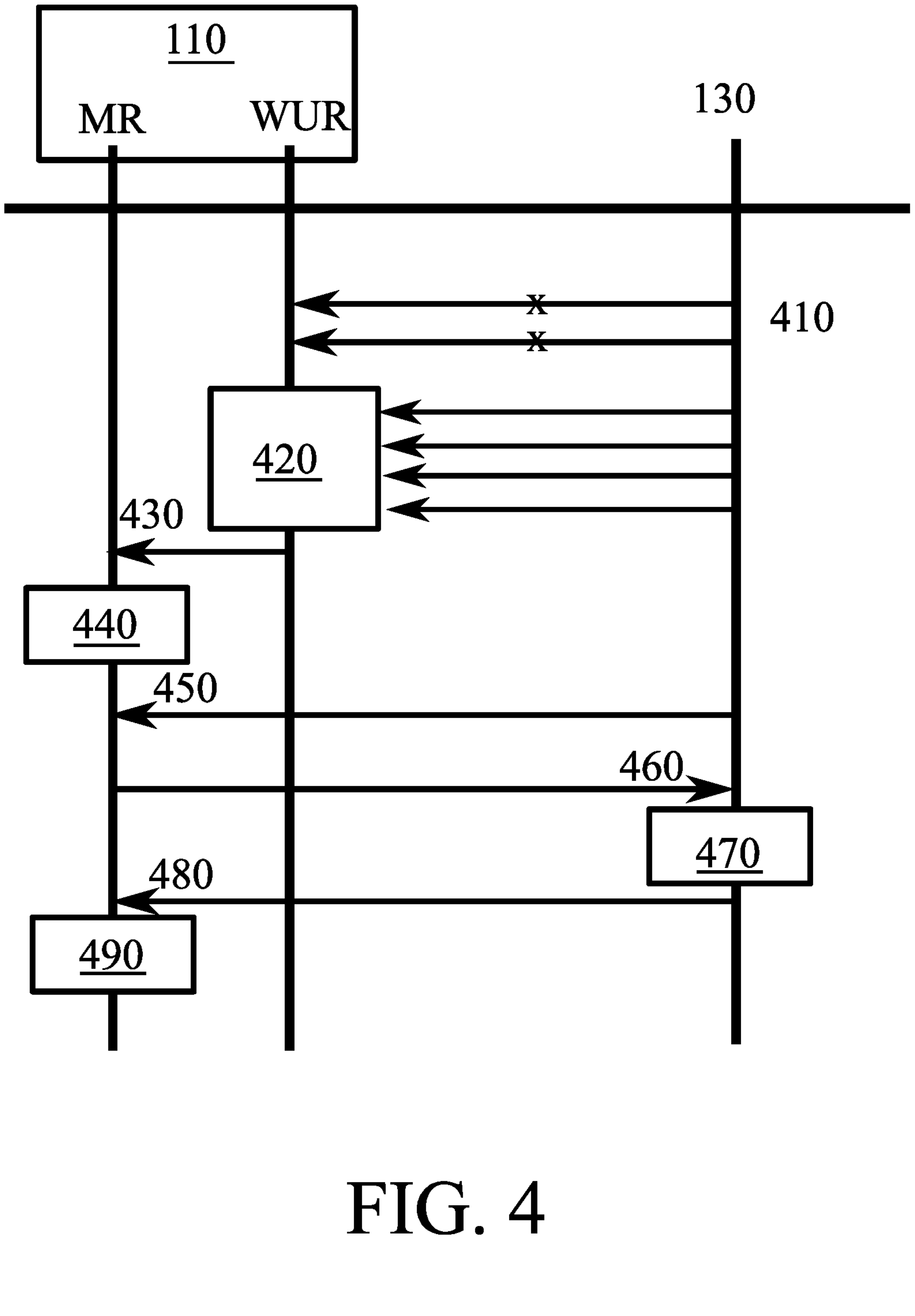
FIG. 4 illustrates signalling in accordance with at least some embodiments of the present invention.

FIG. 4 illustrates signalling in accordance with at least some embodiments of the present invention. On the vertical axes are disposed, on the left, UE 110 of FIG. 1, comprising the wireless transceiver MR and the wireless receiver WUR, and on the right, base station 130. Time advances from the top toward the bottom. UE 110 is in the RRC_INACTIVE state throughout this process.

In phase 410, UE 110 determines a wake-up beam failure, using the WUR, for example by determining that wake-up signal beams in its configured subset are below a threshold. This may be based on beacon transmissions on these wake-up signal beams, for example. In phase 420, which in some cases may precede phase 410, RSPs of all wake-up signal beams in the cell are determined by UE 110, using the WUR. The threshold may be −90 dBm, for example. The threshold may be configurable, or a hard-coded requirement defined in a standard, for example.

In phase 430, UE 110 switches its wireless transceiver MR on. While the arrow of phase 430 in FIG. 4 begins in the WUR, UE 110 may alternatively switch on the MR from a processor, for example. In phase 440, the wireless transceiver MR is activated, and in phase 450 wireless transceiver MR synchronizes with an SSB beam, for example the strongest one. As described above, the wake-up signal beam RSPs determined in phase 420 may assist in selecting the strongest SSB beam, in case there is a meaningful correspondence between wake-up signal beams and SSB beams. Alternatively, the MR may measure which SSB beam is strongest and synchronize then with the strongest SSB beam.

In phase 460, UE 110 provides the request to recover from a wake-up signal beam failure to base station 130. This request and method of its delivery have been described herein above. The request comprises an list of wake-up signal beams, or their identities, ordered in order of their RSPs as measured in phase 420. In phase 470 the base station determines a new subset of wake-up signal beams for UE 110 to monitor, based at least in part on the list received in phase 460 in the request from the UE.

In phase 480, the base station responds to the request by providing the response, the response comprising the new subset of wake-up signal beams for UE 110 to monitor, instead of the original subset. In phase 490, the UE 110 switches the wireless transceiver MR off, to continue monitoring of the wake-up signal beams using the new subset received from the base station in phase 480. In at least some embodiments, phases 460 and 480 are accomplished while maintaining UE 110 in RRC_Inactive state.

Figure 5:
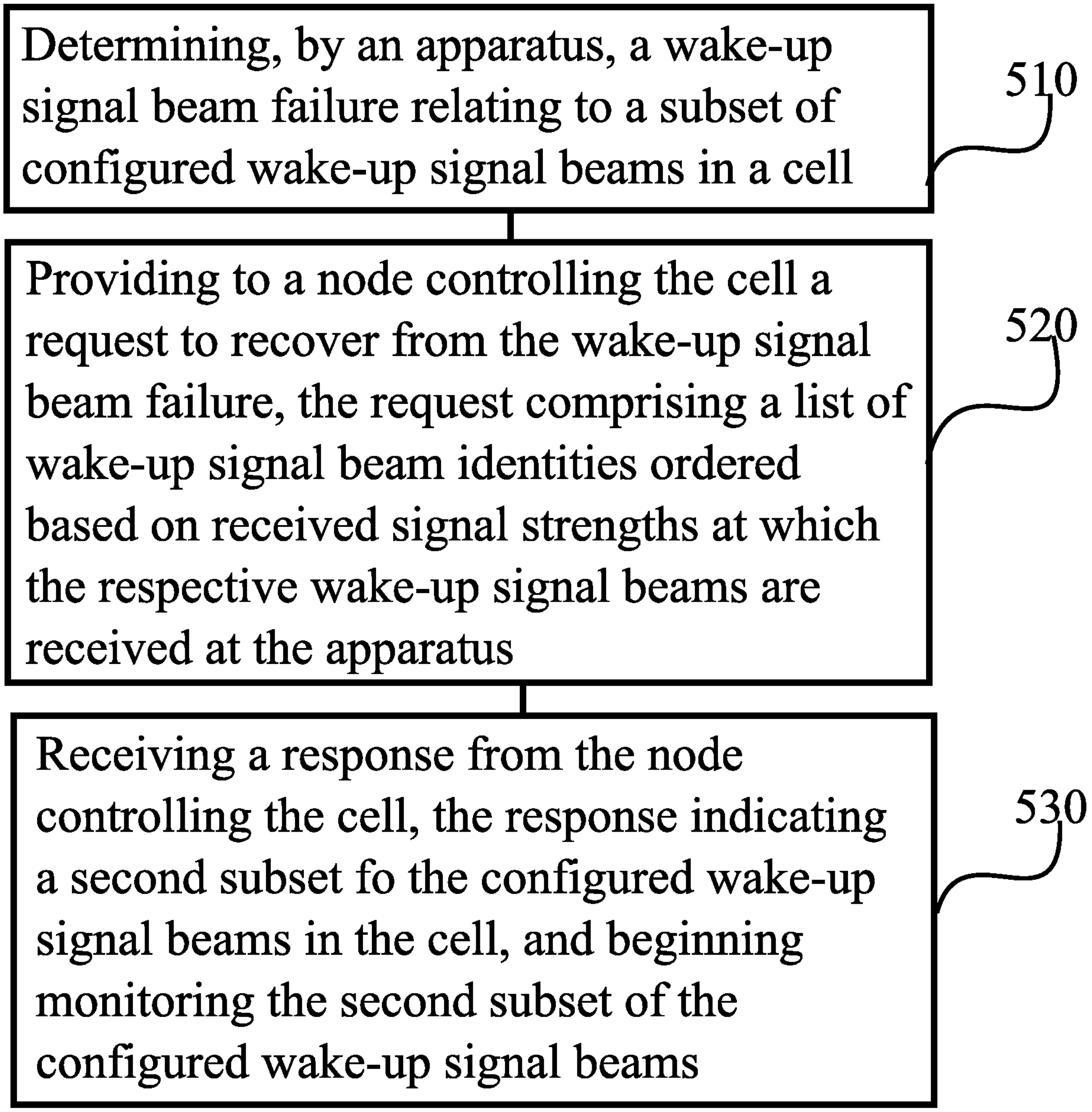
FIG. 5 is a flow graph of a method in accordance with at least some embodiments of the present invention.

FIG. 5 is a flow graph of a method in accordance with at least some embodiments of the present invention. The phases of the illustrated method may be performed in UE 110, or in a control device configured to control the functioning thereof, when installed therein.

Phase 510 comprises determining, by an apparatus, a wake-up signal beam failure relating to a subset of configured wake-up signal beams in a cell. Phase 520 comprises providing to a node controlling the cell a request to recover from the wake-up signal beam failure, the request comprising a list of wake-up signal beam identities ordered based on received signal strengths at which the respective wake-up signal beams are received in the apparatus. Phase 530 comprises receiving a response from the node controlling the cell, the response indicating a second subset of the configured wake-up signal beams in the cell, and beginning monitoring the second subset of the configured wake-up signal beams.

Figure 6:
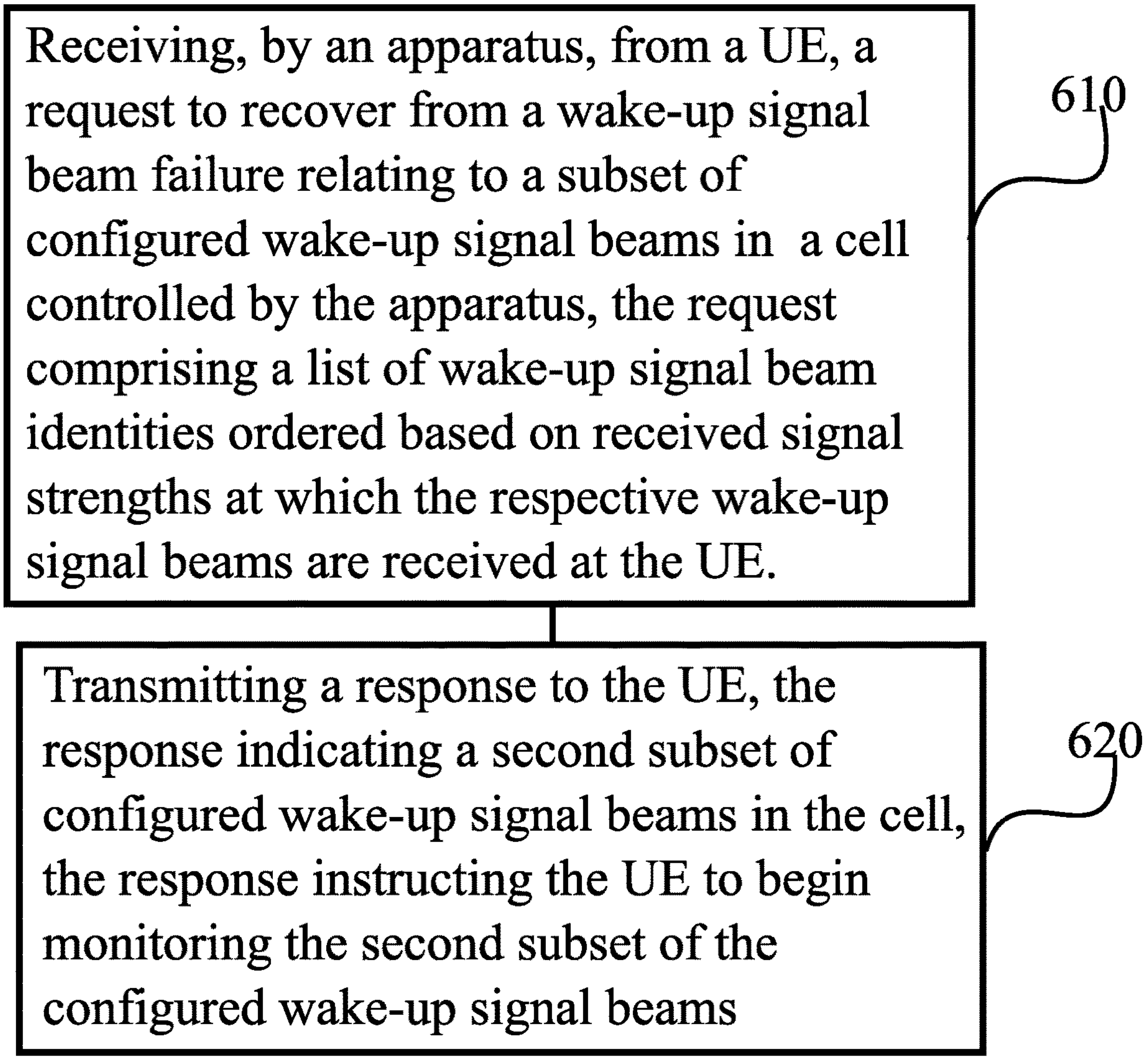
FIG. 6 is a flow graph of a method in accordance with at least some embodiments of the present invention.

FIG. 6 is a flow graph of a method in accordance with at least some embodiments of the present invention. The phases of the illustrated method may be performed in base station 130, or in a control device configured to control the functioning thereof, when installed therein.

Phase 610 comprises receiving, in an apparatus, from a user equipment, a request to recover from a wake-up signal beam failure relating to a subset of configured wake-up signal beams in a cell controlled by the apparatus, the request comprising a list of wake-up signal beam identities ordered based on received signal strengths at which the respective wake-up signal beams are received at the user equipment. Finally, phase 620 comprises transmitting a response to the user equipment, the response indicating a second subset of configured wake-up signal beams configured in the cell, the response instructing the user equipment to begin monitoring the second subset of the configured wake-up signal beams.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing connectivity with low-power wireless devices.

ACRONYMS LIST

PRACH physical random access channel
RSP received signal power
RRC radio resource control
SSB synchronization signal block
WUR wake-up receiver

REFERENCE SIGNS LIST

| | |
|---|---|
| 110, 120 | user equipment |
| 130 | base station |
| 131, 132 | radio links |
| 140a-140e | wake-up signal beams |
| 300-370 | structure of the device of FIG. 3 |
| 410-490 | phases of the process of FIG. 4. |
| 510-530 | phases of the method of FIG. 5 |
| 610-620 | phases of the method of FIG. 6 |

What is claimed:

1. An apparatus comprising a wireless transceiver, a wake-up receiver separate from the wireless transceiver, at least one processor and at least one memory storing instructions that, when executed by the at least one processor, cause the apparatus at least to:
   - while the apparatus is in a radio resource control, RRC, inactive state and the wireless transceiver is in a low-power state, monitor, using the wake-up receiver, only a first proper subset of all wake-up signal beams configured in a cell;
   - determine, using the wake-up receiver, received signal powers, RSPs, of wake-up signal beam beacon transmissions transmitted over all wake-up signal beams configured in the cell;
   - determine a wake-up signal beam failure responsive to determining that all wake-up signal beams in the first proper subset are below an RSP threshold;
   - compile a request to recover from the wake-up signal beam failure, the request comprising (i) a list of wake-up signal beam identities ordered based on the RSPs and (ii) an implicit or explicit indication that the wake-up signal beam failure has occurred;
   - switch the wireless transceiver from the low-power state to an active state;
   - select a synchronization signal block, SSB, beam for communicating with a node controlling the cell based at least in part on a correspondence between the wake-up signal beams and SSB beams and the RSPs;
   - transmit, using the wireless transceiver and without transitioning the apparatus away from the RRC inactive state, the request to the node controlling the cell;
   - receive, using the wireless transceiver and without transitioning the apparatus away from the RRC inactive state, a response from the node controlling the cell, the response indicating a second subset of the wake-up signal beams as an updated cell-specific wake-up signal tracking area, CWTA, for the apparatus; and
   - update the monitored subset to the second subset, switch the wireless transceiver off, and continue monitoring wake-up signal beams using the wake-up receiver and the second subset.

2. The apparatus of claim 1, wherein wake-up signal beams outside the first proper subset are not monitored by the apparatus before the wake-up signal beam failure, and wherein monitoring of wake-up signal beams in the first proper subset is discontinued after receipt of the response except for any wake-up signal beam that is also in the second subset.

3. The apparatus of claim 2, wherein the wake-up signal beams are distinct from beams used in cellular data communication and are used exclusively for wake-up signal and wake-up beacon provision to user equipment.

4. The apparatus of claim 3, wherein all of the following apply to the wake-up signal beam beacon transmissions:
   - (i) the wake-up signal beam beacon transmissions are transmitted periodically;
   - (ii) the wake-up signal beam beacon transmissions are transmitted over all wake-up signal beams configured in the cell;
   - (iii) the wake-up signal beam beacon transmissions provide timing to the wake-up receiver; and
   - (iv) the wake-up signal beam beacon transmissions have a waveform that is the same as a wake-up signal waveform.

5. The apparatus of claim 4, wherein each RSP is an average signal power evaluated over a bit duration of the wake-up signal, and wherein the RSP threshold is −90 dBm, configurable, or hard-coded in a standard.

6. The apparatus of claim 5, wherein the wake-up signal beam identities comprise transmission configuration indication states or transmission configuration indication state identities, and wherein the list is ordered in ascending or descending order of RSP.

7. The apparatus of claim 6, wherein the list includes only wake-up signal beams having RSPs above a second threshold and includes at least the strongest wake-up signal beam or two strongest wake-up signal beams even if the strongest wake-up signal beam or the two strongest wake-up signal beams do not exceed the second threshold.

8. The apparatus of claim 7, wherein the request and the response are communicated using a two-step random access process in which a first step comprises the request and a second step comprises the response.

9. The apparatus of claim 8, wherein the request is sent as a RRCResumeRequest message or a RRCResumeRequest1 message with the request therein and with a CWTA-Update ResumeCause, and wherein the response is received in a RRCRelease message with suspendConfig.

10. The apparatus of claim 1, wherein the request is conveyed using a variable-length request medium access control control element having a length that varies based on a number of reported candidate beams having RSPs above a minimum threshold, and wherein the response is conveyed using a response medium access control control element.

11. The apparatus of claim 1, wherein there is a one-to-one correspondence between the wake-up signal beams and the SSB beams, and wherein the selected SSB beam corresponds to a wake-up signal beam having a strongest RSP.

12. The apparatus of claim 1, wherein the updated CWTA corresponds to the second subset, is valid while a UE context for the apparatus is stored at the node during the RRC inactive state or an RRC connected state, and is updated as a result of the wake-up signal beam failure recovery.

13. The apparatus of claim 1, wherein the second subset indicated in the response is selected by the node based on whether wake-up signal beams having highest RSPs are available for the apparatus within wake-up signal groups relevant to the apparatus and, if not, by selecting at least one beam from a lower-priority wake-up signal group.

14. The apparatus of claim 1, wherein the instructions, when executed by the at least one processor, cause the apparatus to:

(i) determine the wake-up signal beam failure using the wake-up receiver while the apparatus remains in the RRC inactive state;

(ii) determine RSPs of all wake-up signal beams in the cell using the wake-up receiver;

(iii) switch the wireless transceiver from the low-power state to the active state after determining the wake-up signal beam failure;

(iv) synchronize the wireless transceiver with the selected SSB beam;

(v) transmit the request to the node controlling the cell using the wireless transceiver;

(vi) receive the response comprising the second subset from the node controlling the cell using the wireless transceiver; and (vii) switch the wireless transceiver off after receiving the response and continue monitoring wake-up signal beams with the wake-up receiver using the second subset.

15. A method performed by a terminal device comprising a wireless transceiver and a wake-up receiver separate from the wireless transceiver, the method comprising:

while the terminal device is in a radio resource control, RRC, inactive state and the wireless transceiver is in a low-power state, monitoring, using the wake-up receiver, only a first proper subset of all wake-up signal beams configured in a cell;

determining, using the wake-up receiver, received signal powers, RSPs, of wake-up signal beam beacon transmissions transmitted over all wake-up signal beams configured in the cell;

determining a wake-up signal beam failure responsive to determining that all wake-up signal beams in the first proper subset are below an RSP threshold;

compiling a request to recover from the wake-up signal beam failure, the request comprising (i) a list of wake-up signal beam identities ordered based on the RSPs and (ii) an implicit or explicit indication that the wake-up signal beam failure has occurred;

switching the wireless transceiver from the low-power state to an active state;

selecting a synchronization signal block, SSB, beam for communicating with a node controlling the cell based at least in part on a correspondence between the wake-up signal beams and SSB beams and the RSPs;

transmitting, using the wireless transceiver and without transitioning the terminal device away from the RRC inactive state, the request to the node controlling the cell;

receiving, using the wireless transceiver and without transitioning the terminal device away from the RRC inactive state, a response from the node controlling the cell, the response indicating a second subset of the wake-up signal beams as an updated cell-specific wake-up signal tracking area, CWTA, for the terminal device; and updating the monitored subset to the second subset, switching the wireless transceiver off, and continuing monitoring wake-up signal beams using the wake-up receiver and the second subset.

16. The method of claim 15, wherein the request is sent as a RRCResumeRequest message or a RRCResumeRequest1 message with the request therein and with a CWTA-Update ResumeCause, and wherein the response is received in a RRCRelease message with suspendConfig.

17. The method of claim 15, wherein the request is conveyed using a variable-length request medium access control control element having a length that varies based on a number of reported candidate beams having RSPs above a minimum threshold, and wherein the response is conveyed using a response medium access control control element.

18. An apparatus for a node controlling a cell, the apparatus comprising at least one processor and at least one memory storing instructions that, when executed by the at least one processor, cause the apparatus at least to:

store an access stratum context for a user equipment while the user equipment is in a radio resource control, RRC, inactive state;

transmit wake-up signal beam beacon transmissions over all wake-up signal beams configured in the cell;

maintain, for the user equipment, a first cell-specific wake-up signal tracking area, CWTA, corresponding to a first proper subset of the wake-up signal beams configured in the cell;

receive, from the user equipment and while the user equipment remains in the RRC inactive state, a request to recover from a wake-up signal beam failure relating to the first proper subset, the request comprising (i) a list of wake-up signal beam identities ordered based on received signal powers, RSPs, measured by a wake-up receiver of the user equipment and (ii) an implicit or explicit indication that the wake-up signal beam failure has occurred;

determine, based at least in part on the list, a second proper subset of the wake-up signal beams as an updated CWTA for the user equipment; and transmit, to the user equipment and without instructing the user equipment to leave the RRC inactive state, a response indicating the second proper subset and instructing the user equipment to monitor the second proper subset.

19. The apparatus of claim 18, wherein the request is received as a RRCResumeRequest message or a RRCResumeRequest1 message with the request therein and with a CWTA-Update ResumeCause, and wherein the response is transmitted in a RRCRelease message with suspendConfig.

20. The apparatus of claim 18, wherein determining the second proper subset comprises choosing one or more strongest wake-up signal beams from the ordered list when available within wake-up signal groups relevant to the user equipment and otherwise selecting a beam from a lower-priority wake-up signal group.

* * * * *